United States Patent [19]

Molina

[11] 4,243,547

[45] Jan. 6, 1981

[54] COMPOSITION AND METHOD FOR REMOVING WATER AND AQUEOUS LEAK TRACER SOLUTIONS FROM FUEL TANKS

[75] Inventor: Orlando G. Molina, Westminster, Calif.

[73] Assignee: Rockwell International Corporation, El Segundo, Calif.

[21] Appl. No.: 66,608

[22] Filed: Aug. 15, 1979

[51] Int. Cl.$^3$ .......................... C09K 3/32; B85B 1/04; G01M 3/04
[52] U.S. Cl. ................................ 252/194; 73/40.5 R; 73/40.7; 141/1
[58] Field of Search .................. 252/194, 301.19, 408; 141/1; 73/40.7, 40.5 R

[56] References Cited

U.S. PATENT DOCUMENTS

| | | | |
|---|---|---|---|
| 3,975,634 | 8/1976 | Molina | 250/302 |
| 3,989,949 | 11/1976 | Molina | 250/302 |
| 4,035,641 | 7/1977 | Molina | 250/302 |
| 4,186,304 | 1/1980 | Molina | 250/302 |
| 4,191,655 | 4/1980 | Quinn et al. | 252/60 |

*Primary Examiner*—F. C. Edmundson

*Attorney, Agent, or Firm*—Charles T. Silberberg; Max Geldin

[57] ABSTRACT

Combination of a nonionic oxyalkylated alcohol surfactant and an engine fuel, e.g. a 50—50 mixture, by volume, of such surfactant and an aircraft engine fuel such as JP-4 jet fuel, consisting essentially of a mixture of gasoline and kerosene, which is miscible both with water-based and oil-based liquids, for removing water or water-based leak tracer solution entrapped in a fuel tank system, e.g. of an aircraft. When employing, for example, an aqueous leak tracer solution introduced into a fuel tank, e.g. of an aircraft, for locating any leaks therein, after inspection and removal of the main body of leak tracer solution from the tank, in order to remove any residual leak tracer solution which remains entrapped in the tank, the invention composition, hereinafter termed a "depuddling agent", is introduced and blends with the residual leak tracer solution, and the resulting miscible mixture is drained from the system. Any remaining portions of such mixture are miscible with the subsequently introduced oil or petroleum-based fuel, and the resulting mixture also can be drained from the system or burned out by the aircraft engines during test runs.

14 Claims, No Drawings

COMPOSITION AND METHOD FOR REMOVING WATER AND AQUEOUS LEAK TRACER SOLUTIONS FROM FUEL TANKS

BACKGROUND OF THE INVENTION

This invention relates to an improved composition for removing water and residual aqueous leak tracer solutions used in locating leaks in fuel tanks, particularly in aircraft, and is especially concerned with an improved "depuddling" agent, which is miscible with both a water-based solution used for detecting or tracing leaks in fuel tanks, and with the oil-based fuel employed in such tanks, and which can be readily employed for removing residual leak tracer solution from the fuel tanks prior to introduction of the main body of fuel into the tanks. The invention also concerns procedure for employing such "depuddling" agent for removing residual leak tracer solution from fuel tanks.

In my copending application Ser. No. 66,609, filed Aug. 15, 1979, there is disclosed and claimed leak tracer solutions particularly effective for inspection of aircraft fuel tanks and lines prior to use, consisting essentially of water, a nonionic oxyalkylated aliphatic alcohol surfactant, and a small amount of a dye which is essentially non-staining on painted surfaces. The leak tracer solution is introduced into the fuel tank system, and following inspection for leaks in the system, generally the leak tracer solution is drained from the fuel tanks and lines. However, problems of entrapment of the leak tracer solution in components of the fuel system arise, since the fuel which is then introduced into the fuel tanks is oil-based, such as a hydrocarbon, and is not miscible with the water-based leak tracer. Accordingly, the residual leak tracer solution, e.g. in crevices or corners of the fuel tank system, and in low portions of fuel lines, remains entrapped therein and is not removed.

It is accordingly an object of the present invention to provide a composition or liquid which can be employed to "bridge" or "couple" a water-based solution such as the above noted leak tracer solution, with an oil-based liquid, such as the hydrocarbon fuel of an aircraft. Another object of the invention is the provision of a composition or solution having the above characteristics, and hereinafter termed a "depuddling" agent, which is miscible with an aqueous leak tracer solution employed for detection of leaks in fuel tank systems, and with the oil-based fuel employed in such tank system, so that the depuddling agent forms a solution with any residual leak tracer solution, and the resulting mixture or solution forms another solution with the oil-based fuel, so that the final mixture can be readily removed from the fuel tank system. A still further object is the provision of procedure for removing residual or trace amounts of leak tracer solutions from fuel tank systems, employing the above compositions or dupuddling agents.

U.S. Pat. No. 4,035,641 discloses a liquid oxygen compatible dye penetrant composition which comprises an oxyalkylated aliphatic alcohol nonionic surfactant, a small amount of a dye soluble in such surfactant, and a major proportion of a non-halogenated organic solvent, such as a saturated aliphatic hydrocarbon, e.g. containing from about 5 to about 8 carbon atoms.

In my copending application, Ser. No. 925,497, filed July 17, 1978, there is disclosed and claimed a liquid dye penetrant composition, comprising an oxyalkylated aliphatic alcohol non-ionic surfactant, a dye soluble therein, and an isoparaffinic solvent extender consisting essentially of isoparaffins.

SUMMARY OF THE INVENTION

The above objects and advantages are achieved according to the invention by employing as a "depuddling" agent for removal of residual aqueous leak tracer solution from fuel tanks, a composition consisting essentially of a nonionic oxyalkylated aliphatic alcohol surfactant and a liquid organic fuel such as an oil-based or petrolium-based fuel, e.g. in the form of a hydrocarbon, or mixtures thereof, particularly in the proportions noted below.

The composition or depuddling agent of the invention is capable of bridging or coupling a water-based solution such as an aqueous leak tracer solution, with an oil-based liquid, such as a hydrocarbon fuel. The composition or depuddling agent of the invention is accordingly particularly useful in the removal of residual or trace amounts of a leak tracer solution employed for inspection of a fuel tank system, in conjunction with the fuel employed in such systems. Thus, the depuddling agent of the invention is of a unique type which chemically blends the water-based leak tracer solution which remains entrapped within the fuel tank system, including the associated fuel lines, with the oil or petroleum-based fuel, e.g. aircraft fuel, so that in this manner, the remaining portions of the leak tracer solution are leached out of the system with subsequently added fuel.

Hence, as a feature of the invention, the fuel tank system's own fuel is employed as a component of the depuddling agent formulation. As pointed out below, the proportions of nonionic surfactant component and fuel component of the depuddling agent are balanced so as to obtain complete miscibility of the depuddling agent with both the aqueous residual leak tracer solution in the fuel tank system, and with the fuel introduced into the fuel tank system following leak inspection.

The depuddling agent of the invention, consisting only of two components, one of which is the fuel employed in the fuel tank system itself, is highly economical and readily manufactured and used. It can be readily stored and is reusable. The nature of the depuddling agent of the invention is such that it can be used for removal of water from fuel tanks, lines and carburetors of automotive vehicles, marine vessels, diesel powered vehicles such as locomotives and trucks, and jet aircraft.

The depuddling agent of the invention can be employed particularly in leak inspection and leak tracer removal operations of military and commercial aircraft, and also in marine, diesel locomotive and automotive leak testing operations. Generally the depuddling agent of the invention can be employed in all applications which require removal of entrapped water or aqueous leak tracer solution from the inside of fuel tanks, lines and carburetors.

The invention accordingly affords a method for removing residual water or aqueous leak tracer solution from a fuel tank of a vehicle and/or fuel lines, including associated components, which comprises introducing into said fuel tank and/or said lines a composition consisting essentially of a nonionic oxyalkylated aliphatic alcohol surfactant and a liquid organic fuel for said vehicle, said composition being miscible with said water or said aqueous leak tracer solution, and with said liquid fuel, and forming a solution of said composition and said residual water or said aqueous leak tracer solution, and introducing said liquid fuel into said fuel tank and/or fuel lines, for admixture with said solution, and flushing the resluting mixture from said fuel tanks and/or fuel lines, with an additional amount of said liquid fuel.

DETAILED DESCRIPTION AND EMBODIMENTS OF THE INVENTION

The nonionic surfactants which are incorporated into the aqueous "depuddling" solutions or compositions of the invention consist essentially of an oxyalkylated aliphatic alcohol or mixtures thereof, formed of an aliphatic primary or secondary alcohol carrying ethoxy or propoxy groups or mixtures thereof.

More particularly, one class of such nonionic surfactants can be defined as straight chain, primary, aliphatic oxyalkylated alcohols, generally in the form of mixtures thereof, wherein the primary aliphatic alcohols can have from 8 to 20 carbon atoms, preferably 10 to 18 carbon atoms, and the oxyalkyl groups are ethylene oxide and propylene oxide, preferably in the form of a mixture thereof.

One group of nonionic surfactants within the class of materials defined immediately above is a cogeneric mixture of compounds represented by the formula:

   (1)

wherein:

R is an essentially linear akyyl group having from 10 to 18 carbon atoms, with the proviso that at least 70 weight percent of said compounds in said mixture have an R of from 12 to 16 carbon atoms, and A is a mixture of oxypropylene and oxyethylene groups, said oxypropylene and oxyethylene groups being from 55% to 80% of the total weight of the compounds, the oxypropylene and oxyethylene ratio of said total weight being from 0.85:1 to 2.75:1, preferably 1.25:1 to 2.25:1.

Another preferred class of condensation products or oxyalkylated alcohols within the above definition are those wherein the aliphatic alcohols of the oxyalkylated alcohols, or R in the above formula, ranges from 12 to 18 carbon atoms, and the total number of ethylene oxide and propylene oxide groups in the mixture thereof, or designated A in the above formula, ranges from about 4 to about 14.

The term "cogeneric mixture" as employed herein, designates a series of closely related homologues obtained by condensing a plurality of oxide units, with an alcohol or a mixture thereof. As is known, when a mixture of this type is generated, various oxyalkylene chain lengths are obtained.

Alcohols which may be employed in the preparation of the products noted above are those essentially linear, primary, aliphatic alcohols having from 8 to 20 carbon atoms, preferably 10 to 18 carbon atoms. Mixtures of alcohols are usually preferred since their use provides for a good balance of properties in the resulting products. Examples of alcohols which are operable include decyl alcohol, undecyl alcohol, lauryl alcohol, tridecyl alcohol, tetradecyl alcohol, pentadecyl alcohol, cetyl alcohol, heptadecyl alcohol, stearyl alcohol, hydrogenated tallow alcohol, and mixtures thereof. They may be naturally derived such as from coconut oil or synthetically-derived such as from linear alkanes or linear olefins.

The above nonionic surfactants employed according to the invention, are prepared by condensing an alcohol or mixture of alcohols, as described above, with a mixture of ethylene oxide and propylene oxide, in the presence of an alkaline catalyst, such as potassium hydroxide. The oxide mixture may be added to the alcohol in one continuous step or it may be added in several steps. The products thus produced possess random distribution of oxyethylene and oxypropylene groups.

The nonionic surface active agents described above and their method of preparation are disclosed in U.S. Pat. No. 3,504,041, and such disclosure is incorporated herein by reference. These surface active agents are believed to include for example, that class of surfactants which are marketed as the "Plurafac" surfactants "RA-40" grades.

Another class of biodegradable liquid, water miscible oxyalkylated alcohol condensation products within the above definition are those wherein the aliphatic alcohol, or R, is a straight chain alkyl group having from 8 to 20 carbon atoms, the number of ethylene oxide groups in the mixture thereof with propylene oxide, or A ranges from 3.75 to 12.75, and the number of propylene oxide groups in such mixture ranges from 1.7 to 7.0, the oxyethylene to oxypropylene ratio in such mixtures being from 1.8:1 to 2.2:1. This mixture of condensation products and the method of their preparation are disclosed in U.S. Pat. No. 3,340,309, and such disclosure is also incorporated herein by reference. The nonionic oxyalkylated alcohols marketed as the "RO-20" grades of "Plurafac", are believed representative of the class of surface active agents disclosed in the latter patent.

Various other "Plurafac" grades which are marketed and are believed to be generally within the above-described classes of oxyalkylated alcohol surfactants are those designated RA-43, A-24, A-25, B-25-5, B-26 and D-25.

Dye penetrant compositions containing the above described primary aliphatic oxyalkylated alcohols as vehicle, and a dye are described in my U.S. Pat. No. 3,915,885.

A class of particularly preferred nonionic biodegradable surfactants which can be employed in the depuddling compositions according to the present invention are ethoxylates of a mixture of linear secondary aliphatic alcohols, with the hydroxyl groups randomly distributed, the linear aliphatic hydrophobic portion of such alcohols being a mixture of alkyl chains containing in the range from 10 to 17 carbon atoms, preferably from 11 to 15 carbon atoms, and containing an average of from 3 to 12 moles of ethylene oxide.

The above particularly preferred class of nonionic biodegradable surfactant employed according to the invention is a mixture of compounds which can be represented by the formula:

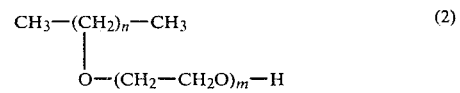   (2)

where n is in the range from 9 to 13, and m is 3 to 12.

Although preferably each of the above-defined surfactants is formed of a mixture of two or more linear alkyl hydrophobic chains ranging from $C_{11}$ to $C_{15}$, as noted below, the surfactant can contain a single such chain formed from a single secondary aliphatic alcohol of the types described below.

The linear alkyl hydrophobic portion of the above defined surfactant is a mixture of $C_{11}$ to $C_{15}$ linear alkyl chains, and can be derived from a mixture of $C_{11}$ to $C_{15}$ aliphatic secondary alcohols, for example the secondary undecyl, dodecyl, tridecyl, tetradecyl and pentadecyl alcohols. The hydrophilic portion of the surfactant is a polyoxyethylene chain randomly attached to any carbon atom of the linear alkyl hydrophobic chains, other than to the terminal carbon atoms thereof, through an ether linkage. It will accordingly be understood that the specific carbon atom in the alkyl hydrophobic chains to which the hydrophilic polyoxyethylene chain is attached will become a

group. Such hydrophilic polyoxyethylene chain is generally expressed in terms of an average number of moles of ethylene oxide.

Illustrative examples of biodegradable nonionic surfactants of the types defined in the above formula are those consisting of a mixture of ethoxylates of from 11 to 15 carbon atoms in the aliphatic hydrophobic chain, and which have an average of 3, 5, 7, 9 and 12 moles of ethylene oxide, respectively, as the hydrophil.

Materials corresponding to these five examples of biodegradable nonionic surfactants are marketed, respectively, as:

| Tergitol | 15-S-3 |
| " | 15-S-5 |
| " | 15-S-7 |
| " | 15-S-9 |
| " | 15-S-12 |

In each case of the Tergitol S series of surfactants listed above, the number to the left of the "S" indicates a hydrophobic aliphatic chain of from 11 to 15 carbon atoms derived from a mixture of alcohols on $C_{11}$ to $C_{15}$ backbone chains, and the number to the right of the "S" designates the average number of moles of ethylene oxide as the hydrophil. Thus, for example, Tergitol 15-S-5 is a mixture of linear aliphatic alcohols in the $C_{11}$ to $C_{15}$ range ethoxylated with an average of 5 moles of ethylene oxide. All of these commercially marketed Tergitol S series of surfactants are water soluble except for Tergitol 15-S-3, which is essentially water insoluble. Mixtures of these materials can also be employed in providing the dye penetrant of the invention, such as a mixture of the above Tergitols 15-S-5 and 15-S-3; a mixture of 15-S-3 and 15-S-9; and a mixture of 15-S-5 and 15-S-9.

The above preferred class of nonionic biodegradable surfactants employed in the depuddling solution according to the invention, are prepared by reacting an alcohol or mixture of alcohols, with the desired proportion of ethylene oxide, in the presence of an alkaline catalyst, such as potassium hydroxide. The ethylene oxide may be added to the alcohol or mixture of alcohols in one continuous step or it may be added in several steps. The products thus produced possess random distribution of oxyethylene groups, as noted above.

Another process for preparing the above nonionic surfactants in the form of ethoxylates of linear secondary aliphatic alcohols, is described in U.S. Pat. No. 2,870,220.

Tergitol 15-S-3 is essentially water insoluble and is usually employed in combination with the other members of the Tergitol S series noted above, such as Tergitol 15-S-5 and 15-S-9.

Dye penetrant compositions containing the above described ethoxylates of secondary aliphatic alcohols as vehicle and a dye are described in my U.S. Pat. No. 3,915,886.

Also, particularly effective depuddling solutions are provided according to the invention employing a combination or mixture of the above Tergitols 15-S-5 and 15-S-9, and to which there can be added optionally Tergitol 15-S-3, as described in my U.S. Pat. No. 3,939,092.

There can also be employed ethoxylates of linear primary alcohols, corresponding to the ethoxylates of the linear secondary alcohols of the Tergitol S series of nonionic surfactants described above. Thus, the Tergitol 25-L series of nonionic surfactants is derived by ethoxylation of a blend of $C_{12}$ to $C_{15}$ linear primary alcohols, the soluble derivatives of which contain from about 5 to about 9 moles of ethylene oxide, per mole of primary alcohol.

As previously noted, the above nonionic oxyalkylated aliphatic alcohol surfactant is employed in conjunction with the fuel utilized in the particular fuel tank system being treated. Such fuel component can be any organic fuel utilized in a vehicle, such as gasoline in an internal combustion engine, diesel oil for locomotives or jet fuel in an aircraft. Thus, such fuels are generally petroleum distillates ranging from low boiling gasoline fractions to high boiling diesel oil fractions, and can consist of saturated and/or unsaturated hydrocarbons, and particularly mixtures thereof containing from 6 to 20 carbon atoms. In the case of certain aircraft fuels such as JP-4 jet fuel, the latter fuel contains a mixture of hydrocarbons containing 6 to 16 carbon atoms and consisting essentially of two parts of gasoline (6 to 8 carbon atom hydrocarbons to one part of kerosene (10 to 16 carbon atom hydrocarbons), by weight.

The proportions of nonionic oxyalkylated aliphatic alcohol surfactant and fuel components in the depuddling composition of the invention can vary, and generally range from about 25 to about 90% of nonionic surfactant and 75 to about 10% of the fuel component, by volume. Using too low a proportion of nonionic surfactant in the depuddling composition may be insufficient to render the depuddling agent completely miscible with the residual water or aqueous leak tracer solution remaining in the fuel tank system and which it is desired to remove. Employing too high a proportion of the nonionic surfactant may tend to cause gelling in conjunction with such residual water or the water in the leak tracer solution, with potential plugging of fuel lines.

Various formulations of depuddling agents were prepared and designed to chemically blend with the water-based leak tracer solution, particularly of the type described in my above copending application, Ser. No. 66,609. Such depuddling agents were also designed to be compatible or miscible with JP-4 jet fuel. Representative hydrophilic-lipophilic depuddling agent formulations are set forth in Table 1 below.

TABLE 1

DEPUDDLING FORMULATIONS

| Depuddling Agent | Ingredients Used (Parts by Volume) | | |
|---|---|---|---|
| | Tergitol 15-S-9 | Tergitol 15-S-5 | JP-4 Fuel |
| 1 | 35 | — | 65 |

TABLE 1-continued

| Depuddling Agent | DEPUDDLING FORMULATIONS Ingredients Used (Parts by Volume) | | |
|---|---|---|---|
| | Tergitol 15-S-9 | Tergitol 15-S-5 | JP-4 Fuel |
| II | — | 50 | 50 |
| III | — | 60 | 40 |
| IV | 70 | — | 30 |
| V | — | 40 | 60 |
| VI | 37.5 | 12.5 | 50 |

Of the depuddling compositions set forth in Table 1 above, composition II consisting of a 50-50 mixture, by volume, of nonionic surfactant, particularly Tergitol 15-S-5, and fuel, particularly JP-4 jet fuel, is the most desirable or optimum composition.

In each of compositions I to VI of Table 1 above, JP-4 fuel can be replaced by gasoline or diesel oil.

As previously noted, the depuddling agent of the invention is employed particularly for the removal of residual water-based leak tracer solutions introduced into a fuel tank system such as the fuel tank system of an aircraft, for removal of such residual leak tracer solution. Although various water-based leak tracer solutions can be employed, which contain water, a surfactant and a dye, the depuddling agent of the invention is particularly employed in conjunction with the leak tracer solution described in my above copending application Ser. No. 66,609, and which disclosure is incorporated herein by reference.

Such leak tracer solutions contain a major proportion of water, not more than about 10% of a nonionic oxyalkylated aliphatic alcohol surfactant of the types described above, and generally about 0.005 to about 1.0% by weight of a water soluble dye, particularly a dye which is non-staining on painted surfaces, e.g. of an aircraft.

The dyes which are incorporated into the above leak tracer compositions or solutions are water soluble dyes which can be either daylight visible dyes or fluorescent dyes made visible by exposure to black or fluorescent light, or such dyes can have dual visibility, that is, they are visible either in daylight or are fluorescent under black or fluorescent light. Such dyes are of a type which do not migrate into or penetrate painted surfaces used on aircraft, such as white polurethane paints.

Preferred dyes which can be used are the water soluble uranine, rhodamine and eosin dyes.

A preferred water soluble uranine dye having the characteristics noted above is Uranine Concentrate 1801 dye, Color Index Yellow 73, marketed by Keystone, Ingham Co., Los Angeles, California. This dye is a sodium salt of fluorescein, and is a yellow-green dual visibility dye visible by exposure either to daylight or fluorescent light.

The soluble rhodamine dyes such as Rhodamine B, Rhodamine-Color Index 10 and Rhodamine WT-Color Index Acid Red 388 can be used. These are also dual visibility dyes. Rhodamine dyes tend to stain painted surfaces, but can be used in leak tracer solutions on equipment such as fuel tanks and lines which have not yet been installed in already painted aircraft. For this reason rhodamine dyes are not preferred dyes for use in the leak tracer solutions of the invention.

The eosin dyes such as Eosin G and Eosin Acid Red 87 also can be used, particularly in the form of their sodium or potassium salts. The eosin dyes are fluorescent dyes which are made visible by exposure to black or fluorescent light.

Water is employed in major proportions in the leak detector solution. Although tap water can be employed, the water used should be as free as possible from residue forming materials such as minerals. Thus, distilled or deionized water can also be used.

The amount of nonionic oxyalkylated surfactant which is incorporated into the above leak detector solution should not be more than about 10% by weight of the composition. Generally, from about 0.1 to about 10% by weight of the surfactant is used. Although up to 20% by weight of the surfactant can be used, this is uneconomic and is not preferred. It has been found, however, that a low surfactant content ranging from about 0.3 to about 2.0% by weight of the leak tracer solution or composition provides best results in improved "creepability" of the leak tracer solution, that is, its ability to penetrate and detect very small cracks and leaks in fuel tanks and lines.

The amount of dye which is incorporated into the leak detector solution containing water and the above nonionic surfactant, to produce the leak tracer composition is generally small, e.g. ranging from about 0.005 to about 1.0% by weight of the composition. Preferably about 0.01 to about 0.10% by weight of the dye is present in the leak tracer solution.

Optionally, a very small amount, e.g. a few drops, of an anti-parasitic agent, per gallon of leak tracer solution, e.g. 8 to 12 ounces per 500 gallons, is incorporated in the leak tracer solution to prevent parasitic algae growth in the solution, particularly if it is stored over an extended period of time. A typical anti-parasitic agent for this purpose is the material marketed as "Clear Bath 105540" which is believed to be an amino based composition, by Spectrum Medical Industries, Torrance, California. However, any suitable alkaline anti-parasitic agent can be employed.

An optimum leak tracer solution according to the invention is the solution or composition A below.

| COMPOSITION A | |
|---|---|
| Component | Percentage by Weight |
| Water | 99.41 |
| Tergitol 15-S-9 | .56 |
| Uranine Conc. 1801 Dye | .03 |
| "Clear Bath 105540" (anti-parasitic agent) | 8 to 12 ounces per 500 gallons water |

It will be noted that Composition A above has low surfactant content, that is in the above noted preferred surfactant range of 0.3 to 2.0% by weight of the composition.

Another representative leak tracer solution, is the solution of Composition B below.

| COMPOSITION B | |
|---|---|
| Component | Percentage by Weight |
| Water | 94.97 |
| Tergitol 15-S-9 | 5.0 |
| Uranine Conc. 1801 dye | .03 |
| "Clear Bath 105540" (anti-parasitic agent) | 8 to 12 ounces per 500 gallons water |

In the method for employing the above leak tracer solution to test for leaks in the fuel tanks and lines, e.g. of an aircraft, the leak tracer solution is purged or introduced particularly into newly fabricated, clean and dry fuel tanks and lines. During the test procedure, the leak tracer solution in the tank and lines can be at a pressure of say 5 psi, but the pressurization of the leak tracer solution during testing is not necessary.

The external surfaces of the tanks and lines are inspected for leaks while under suitable illumination, that is, either white illumination where the dye in the leak tracer solution is a daylight dye, or under black light illumination in dark enclosures when the dye in the leak tracer solution is a fluorescent dye, hr has dual visibility. Particularly the fluorescent characteristics of the fluorescent and dual visibility dyes are used to advantage for locating minute leaks. After locating and marking the leaks indicated by dye smears resulting from passage of leak tracer solution through such leaks, the level of the leak tracer in the tank or lines can be dropped sufficiently to permit repair of the crack or leak, followed by retesting with the leak tracer solution if desired, to verify the effectiveness of the repair.

Following inspection for leaks in the system, and any repairs thereof, if desired, the leak tracer solution is drained from the fuel tanks and lines to remove the leak tracer. In order to remove any residual leak tracer solution which remains entrapped in depressions or crevices of the fuel tanks and lines, the depuddling agent of the invention, e.g. a mixture of Tergitol 15-S-5 and JP-4 jet fuel, is used after the draining of the main body of the leak tracer solution from the system.

After the depuddling agent is introduced into the fuel tank and lines, for removal of residual leak tracer solution, the resulting miscible mixture of leak tracer solution and depuddling agent is drained from the system. Any remaining portions of such mixture are miscible with subsequently introduced petroleum-based fuel, and the resulting mixture can be again drained from the system or burned out by the aircraft engines during test runs prior to introduction of the main body of fuel into the fuel tanks and lines for operation of the aircraft.

The leak tracer solution removed from the tanks and lines following testing, can be reused, and excess depuddling agent drained from the tanks and lines also can be reused, if desired.

The fuel systems, including tanks, fuel lines and carburetors, for example of automotive vehicles, marine vessels, diesel engines and aircraft, which have been in use can be depuddled by allowing their fuel contents to be used up or drained off, then the tanks can be purged with a determined amount of depuddling agent to remove water condensation which often forms pools at the bottom of the tanks and causes corrosion and leaks. Addition of fuel after a short period of dwell time will lift and absorb the depuddler solution which has "leeched out" the water, and by adding additional fuel this mixture can be allowed to be burned out by the engine. The nature of the surfactant in the depuddling agent is similar to the surfactant (detergents) used in automotive oils and therefore has no damaging effect on the engine. Tergitol surfactants are compatible with metals.

The following tests were carried out to determine the degree of solubility or miscibility of the depuddling agent formulation in the leak tracer solutions described above.

Samples of the leak tracer solution, Composition A above, were placed in 50 ml beakers, each containing 25%, 33%, 50% and 60%, by volume, and depuddling agent solution, Composition II above, was added slowly to the remaining volume of each beaker, and introduced therein so as not to cause mechanical mixing of the two solutions. The solutions were left undisturbed and observations were made at 30 minutes, 1 hour, 3 hours, 5 hours and 16 hours intervals, as shown in Table 2.

The degree of intermixing is indicated in Table 2 by numerical values, the higher the numerical value, the greater the intermixing of the two solutions, with the number 10 assigned to complete intermixing when the two solutions visually appear as a clear single solution.

TABLE 2

EFFECTIVENESS OF DEPUDDLER AGENT BLENDING ACTION TEST

| PERCENT BY VOLUME | | Observations of Blending Action at Various Time Increments of the Undisturbed Solutions | | | | |
|---|---|---|---|---|---|---|
| Depud-dler | Leak Tracer | 30 min. | 1 hr. | 3 hrs. | 5 hrs. | 16 hrs. |
| 40 | 66 | 0 | 2 | 2 | 0 | 0 |
| 50 | 50 | 5 | 5 | 5 | 5 | 0 |
| 67 | 33 | 7 | 8 | 8 | 9 | 10 |
| 75 | 25 | 7 | 9 | 9 | 9 | 10 |

It is noted above that the tests involving the use of the higher volumetric proportions of depuddler with respect to leak tracer, namely the tests involving use of 67% to 75% of depuddler, the remainder being leak tracer, by volume, provided the most effective blending of the two solutions, when the depuddler solution was depositied on top of the leak tracer solution in each beaker.

In subsequent tests, the above emulsions or solutions of depuddler and leak tracer were found to have excellent affinity and miscibility with JP-4 fuel, and hence could be effectively flushed out by the use of JP-4 fuel.

The following are examples showing the effectiveness of the depuddling agent or solution of the invention for removal of entrapments of leak tracer solution.

EXAMPLE 1

A test fixture was provided containing dimples or depressions of various depths to simulate areas of mechanical entrapment conditions generally encountered in the internal volume of fuel tanks of an aircraft. Also, clear plastic flexible tubing was used to simulate fuel lines having low areas of entrapment.

Leak tracer solution, namely Composition A above, was introduced and deposited in the dimples of the fixture noted above, and the same leak tracer solution was introduced into the flexible tubing, and deposited in the low areas of the tubing.

The depuddling agent or Composition II above was introduced into the fixture and blended with the entrapped leak tracer solution in the dimples of the fixture, and the same leak tracer solution was introduced into the plastic flexible tubing and blended with the leak tracer solution in the low areas thereof.

The results observed indicated that the depuddling agent was highly effective in immediately blending and leaching out the leak tracer solution entrapped in the relatively shallow areas of the fixture, and in the low areas of the transparent tubing.

The tests were completed by introducing JP-4 jet fuel into the test fixture and the clear plastic tubing, to flush out the combined depuddler and leak tracer solution in each case. Results following the completion of these tests indicated that the depuddling agent and the leak tracer blend were completely removed by the blending of such combination with the JP-4 fuel used as the flushing medium.

Tests of the same type as noted above were conducted but without introduction of the depuddling agent into the test fixture and into the flexible tubing, and employing only the JP-4 fuel as the sole means for flushing out the leak tracer solution from the depressions in the test fixture and from the low areas of the flexible tubing. Results showed that the use of the JP-4 fuel alone, without prior introduction of depuddling agent, was ineffective for removal of the remaining leak tracer solution in most instances.

EXAMPLE 2

The leak tracer solution, Composition A above, was introduced into a system simulating the fuel tanks and lines of an aircraft in the "as painted" newly fabricated condition. The external surfaces of the equipment were viewed under white and black light, indicating the location of numerous leaks by the yellow-green dye smears emitted by the leaking solution. The leaks were marked, the leak tracer solution was drained from the system, and the leaks thus located were repaired.

The above noted depuddling agent of the invention, Composition II, was introduced into the tanks and lines of the above simulated system, forming a blend or solution of the residual leak tracer solution and depuddling agent.

JP-4 jet fuel was then introduced into the simulated system, blending with the mixture of depuddling agent and residual leak tracer solution, and removing the mixture of depuddling agent and leak tracer solution from the system. Thus, the application of jet fuel JP-4 flushed out all traces of the leak tracer and depuddling agent from the system.

As a feature of the invention, the depuddling agent or formulation is designed to have as high as possible a blending action with the leak tracer solution, due to the fact that blending of the depuddling agent with the leak tracer by mechanical agitation of the liquid inside of a tank is relatively poor or almost nonexistent. Accordingly, the use of a combination of the nonionic oxyalkylated aliphatic alcohol surfactant described above, and the fuel which is normal to the environment of the tanks and lines being tested, affords an effective depuddling agent with good lipophilic and hydrophilic coupling characteristics, for blending action with the entrapped leak tracer solution, and with the fuel, and flushing away of the resulting mixture by means of the fuel itself. Thus, the depuddling agent of the invention provides a combination with the leak tracer solution which can be used for leak testing, e.g. newly installed fuel systems of both military and commercial aircraft. The depuddler can be tailored for effectiveness with any type of fuel (petroleum-based) employed by aircraft, including gasoline grade aviation fuel.

It is also noted, as pointed out above, that the depuddling agent of the invention can be used for leaching out water in automotive, diesel locomotive and marine vessel tanks, and removal of the resulting solution by addition of the system's own fuel which blends with such solution.

Since various changes and modifications of the invention will occur to and can be made readily by those skilled in the art without departing from the invention concept, the invention is not to be taken as limited except by the scope of the appended claims.

What is claimed is:

1. A composition for removing residual water or aqueous leak tracer solution from a fuel tank of a vehicle and/or fuel lines and components associated with said tank, which consists essentially of about 25 to about 90% by weight of a nonionic surfactant, said nonionic surfactant being an oxyalkylated aliphatic alcohol or mixtures thereof, formed of an aliphatic primary or secondary alcohol carrying ethoxy or propoxy groups, or mixtures thereof, and about 75 to about 10% of a petroleum-based hydrocarbon fuel, by volume.

2. The composition as defined in claim 1, wherein said surfactant consists of ethoxylates of a mixture of alcohols having the formula:

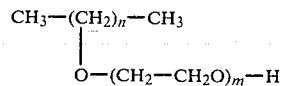

where n is in the range from 9 to 13 and m is an average of 3 to 12.

3. The composition as defined in claim 2, said hydrocarbon fuel consisting of a mixture of saturated and unsaturated hydrocarbons containing from 6 to 20 carbon atoms.

4. The composition as defined in claim 3, said hydrocarbon fuel being a jet engine fuel consisting essentially of a mixture of 2 parts of gasoline and 1 part of kerosene, by weight.

5. The composition as defined in claim 4, consisting of a 50—50 mixture of said surfactant and of said hydrocarbon fuel, by volume.

6. The composition as defined in claim 3, said hydrocarbon fuel being gasoline.

7. The composition as defined in claim 3, said hydrocarbon fuel being a marine engine fuel.

8. The composition as defined in claim 3, said hydrocarbon fuel being diesel oil.

9. The composition as defined in claim 1, said nonionic surfactant being of the group consisting of (a) straight chain primary aliphatic oxyalkylated alcohol, wherein said alcohols can contain from 8 to 20 carbon atoms and the oxyalkyl groups are ethylene oxide, propylene oxide, or a mixture of ethylene oxide and propylene oxide groups, and (b) ethoxylates of linear secondary aliphatic alcohols; with the hydroxyl groups randomly distributed, the linear aliphatic portion of said alcohols being a mixture of alkyl chains containing in the range from 10 to 17 carbon atoms, and containing an average of from 3 to 12 moles of ethylene oxide.

10. The composition as defined in claim 9, wherein said surfactant (a) is a mixture of compounds having the formula:

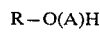

wherein R is an essentially linear alkyl group having from 10 to 18 carbon atoms, at least 70 weight percent of said compounds in said mixture having an R of from 12 to 16 carbon atoms, and A is a mixture of oxypropylene and oxyethylene groups being from 55 to 80% of the total weight of said compounds, the oxypropylene to oxyethylene ratio of said total weight being from 0.85:1 to 2.75:1; and wherein said surfactant (b) are ethoxylates of a mixture of alcohols having the formula:

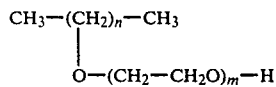

where n is in the range from 9 to 13 and m is an average of 3 to 12.

11. The composition as defined in claim 10, wherein R in said surfactant (a) can have from 12 to 18 carbon atoms, and the total number of A groups can range from about 4 to about 14; and wherein in said surfactant (b) the linear alkyl hydrophobic portion of said surfactant is a polyoxyethylene chain randomly attached to the linear alkyl hydrophobic chains through an ther linkage, and wherein said surfactant (b) is selected from the group consisting of said ethoxylates of said mixture of alcohols, wherein n ranges from 9 to 13, and m is an average of 3, 5, 7, 9 or 12.

12. The composition as defined in claim 1, said hydrocarbon fuel consisting of a mixture of saturated and unsaturated hydrocarbons containing 6 to 20 carbon atoms.

13. The composition as defined in claim 1, said hydrocarbon fuel being a jet engine fuel consisting essentially of a mixture of 2 parts of gasoline and 1 part of kerosene, by weight.

14. The composition as defined in claim 1, wherein said surfactant consists of the ethoxylates of a mixture of $C_{12}$ to $C_{15}$ linear primary alcohols and contains from 5 to 9 moles of ethylene oxide per mole of primary alcohol.

* * * * *